United States Patent [19]

Kantner

[11] Patent Number: 4,491,625

[45] Date of Patent: Jan. 1, 1985

[54] ZINC-BROMINE BATTERIES WITH IMPROVED ELECTROLYTE

[75] Inventor: Edward Kantner, East Brunswick, N.J.

[73] Assignee: Exxon Research & Engineering Co., Florham Park, N.J.

[21] Appl. No.: 593,317

[22] Filed: Mar. 26, 1984

[51] Int. Cl.³ .............................................. H01M 10/44
[52] U.S. Cl. ..................................... 429/50; 429/105; 429/198; 429/199
[58] Field of Search ............... 429/101, 105, 198, 199, 429/50

[56] References Cited

U.S. PATENT DOCUMENTS

| | | | |
|---|---|---|---|
| 3,682,703 | 2/1971 | Smith | 136/6 |
| 3,806,368 | 11/1972 | Maricle et al. | 136/6 R |
| 4,064,324 | 12/1977 | Eustace et al. | 429/101 |
| 4,068,046 | 1/1978 | Eustace et al. | 429/105 |
| 4,105,829 | 8/1978 | Venero | 429/15 |
| 4,418,128 | 11/1983 | Fujii | 429/198 X |

Primary Examiner—Charles F. LeFevour
Attorney, Agent, or Firm—Joseph J. Dvorak

[57] ABSTRACT

The coulombic efficiency of aqueous zinc bromine batteries can be increased if, in addition to the bromide ions required to be present in the electrolyte to charge the cell to rated capacity, chloride ions are added to the electrolyte in amounts sufficient to reduce the amount of free bromine present in the electrolyte during operation of the cell.

7 Claims, 1 Drawing Figure

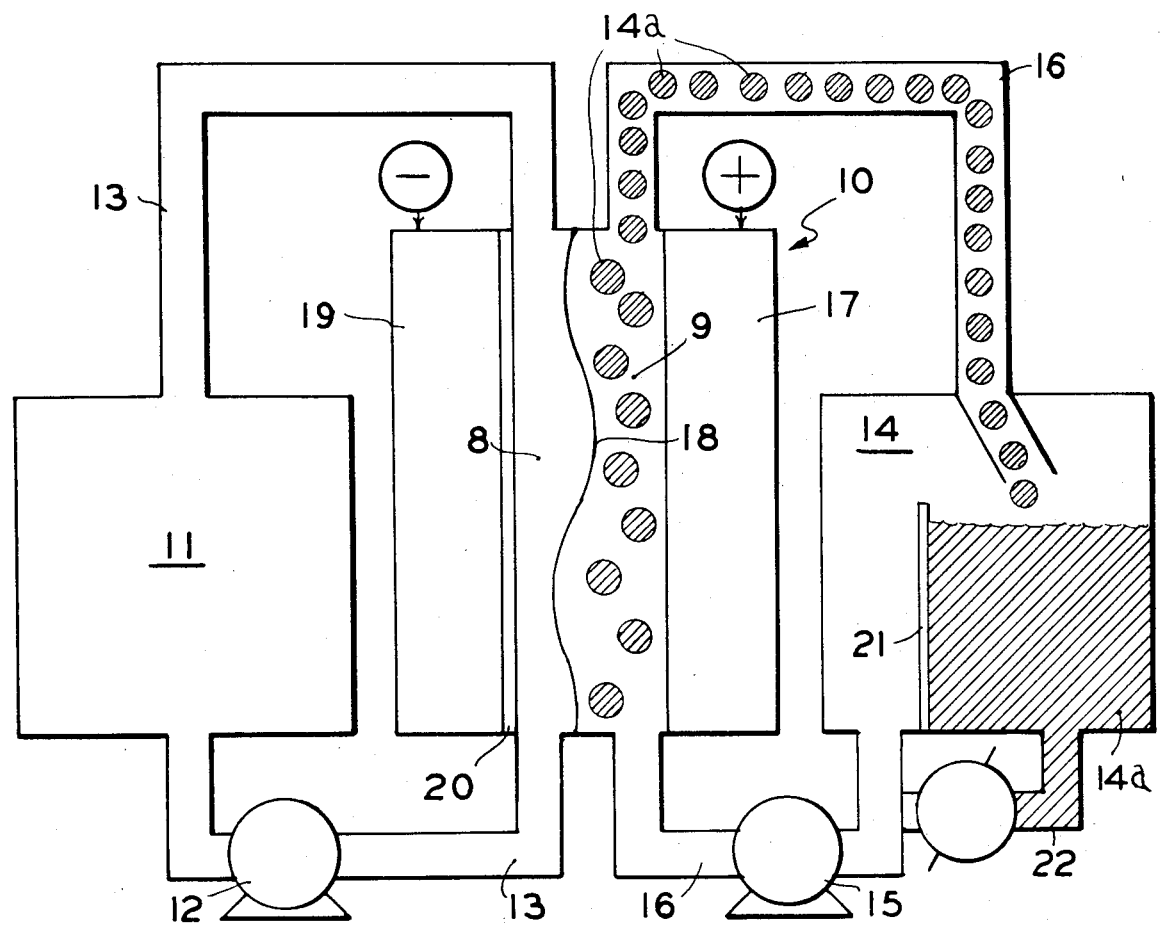

ZINC-BROMINE BATTERIES WITH IMPROVED ELECTROLYTE

FIELD OF THE INVENTION

This invention relates to secondary batteries having as the electrolyte an aqueous zinc bromide solution containing a complexing substituent capable of forming a water immiscible complex with cathodic bromine.

PRIOR ART

As is well known in the art, electrochemical cells have been proposed which have one electrode with a high positive oxidizing potential and another electrode with a strong negative or reducing potential. Typical of such cells is the metal halogen cell in which the anode material most commonly employed is zinc and the most commonly employed cathodic halogen is bromine. Among the advantages of such metal halogen cells is their extremely high theoretical energy density. For example, a zinc bromine cell has a theoretical energy density of 200 Wh/lb, i.e., watt hours per pound, and an electric potential of about 1.85 volts per cell.

Electrochemical cells of the foregoing type are known to suffer from a number of disadvantages. Most of these disadvantages are associated with side reactions which may occur in such cells. For example, during the charging process free bromine is produced in the cell. This free bromine is available for electrochemical reaction with the zinc anode thereby resulting in auto discharge of the cell. Additionally, there is a tendency for hydrogen gas to be generated when considerable amounts of free bromine are present in the aqueous phase.

In U.S. Pat. No. 4,105,829 there is disclosed a metal halogen cell which employs a circulating electrolyte system containing a complexing agent to effectively remove cathodic halogen from the electrolyte during charging of the cell. Basically the complexing substituent or complexing agent is one which, in the presence of halogen, forms a water immiscible halogen complex. This complex is separated and stored external the cell during charging but is returned to the cell during discharge.

Despite the significant improvement that is achieved with the aqueous zinc bromine battery disclosed in the aforementioned patent, coulombic inefficiencies still result in operating such cells since the amount of energy recovered from the cell is less than that which is put in during the charging of the cell. This loss in coulombic efficiency is attributed to the reaction of uncomplexed, dissolved bromine present in the cell with elemental zinc.

SUMMARY OF THE INVENTION

It now has been discovered that the coulombic efficiency of such cells can be increased if, in addition to the bromide ions required to be present in the electrolyte to charge the cell to rated capacity, chloride ions are added to the electrolyte in amounts sufficient to reduce the amount of free bromine present in the electrolyte during charging of the cell.

Thus, in one embodiment of the present invention there is provided aqueous electrolyte for a secondary zinc bromine cells comprising aqueous solution of a water soluble bromine complexing agent capable of forming a water immiscible complex with bromine, from about 1 to 3 moles per liter zinc bromide and from abut 0.5 to 1.75 moles per liter zinc chloride.

BRIEF DESCRIPTION OF THE DRAWINGS

The sole FIGURE is a schematic diagram of a typical circulating zinc bromine electrochemical cell which can benefit from the use of the electrolyte of the present invention.

DETAILED DESCRIPTION OF THE INVENTION

Referring to the FIGURE, a schematic diagram of a typical circulating bipolar zinc bromine electrochemical cell 10 is shown. The zinc bromine electrochemical cell comprises two electrolytes (an anolyte and a catholyte) which are circulated through separate compartments 8 and 9, respectively. In cell 10 the anolyte is stored inn reservoir 11 and circulated, via pump 12, through compartment 8 and loop 13 which is generally referred to as the anode loop. A catholyte which generally is stored in reservoir 14, is pumped, via pump 15, through compartment 9 and loop 16 is generally referred to as the catholyte loop.

A separator 18 delineates and defines the boundary between the anode and cathode compartments 8 and 9, respectively. Separator 18 is a membrane which prevents or hinders movement of anions, such as bromide and tribromide ions, from the cathode compartment 9 to the anode compartment 8. In a bipolar design, the electrode structure 19 for the deposition of zinc and the electrode structure 17 for the generation of bromine are on opposite sides of the same electrode structure.

The electrolyte of the present invention, is an aqueous solution of a complexing constituent capable of forming a water immiscible complex in the presence of elemental bromine, zinc bromide and zinc chloride.

Suitable complexing constituents for use in the electrolyte of the present invention are set forth in U.S. Pat. No. 4,105,829 which is incorporated herein by reference. Among the preferred complexing substituents in the practice of the present invention are N-methyl, N-ethyl morphilinium bromide, N-methyl, N-ethyl-pyrrolidinium bromide, N-methyl, N-ethyl pyrolidinium bromide, N-methyl, N-ethyl piperidinium bromide and mixtures thereof.

In the past, the amount of zinc bromide present in the electrolyte was in substantial excess, e.g., 150%, of that required to charge the cell to its rated capacity. According to the present invention, the amount of zinc bromide present in such electrolyte is an amount sufficient to substantially charge the cell to its rated capacity and in no event greater than 25% in excess of that required. Importantly, in addition to the zinc bromide, chloride ions are added to the electrolyte in amounts sufficient to reduce the amount of free bromine present in the electrolyte during charging of the cell. In general from about 0.5 to about 1.75 moles/liter of chloride ions are added to the electrolyte. Thus, the zinc bromide concentration is said aqueous electrolyte is generally in the range of about 1 to 3 moles per liter, and preferably about 1.5 to 2.5 moles per liter and the zinc chloride concentration and said electrolyte is in the range of about 0.5 to 1.75 moles per liter, and preferably in the range of about 0.8 to 1.2 moles per liter.

Referring again to the FIGURE, in an operation, anolyte and catholyte are circulated through the cell 10 by means of pumps 12 and 15 respectively. At least the catholyte has the composition as described according to the present invention. An electric potential is applied to the cell resulting in depostion of zinc shown as layer 20 on electrode 19. Bromine also is generated. The bromine, which is generated at the chemically inert electrode structure 17, reacts with complexing agent in the electrolyte to form a substantially water immiscible complex 14a. Since the bromine rich complex 14a is heavier than water, it tends to settle on the bottom of tank 14 and is therefore not recirculated, at least in any substantial amount, through the cell during charging. Indeed, the baffle 21 in the holding tank 14 helps with the separation of the bromine containing aqueous insoluble complex. Consequently, substnatially only an aqueous phase is recirculated through the cell during the charging period. On discharing, however, the complex is flowed back to the cathode by first emulsifying and dispersing it in the aqueous phase. This can be accomplished by mixing means (not shown). For example a high shear or ultrasonic mixing device can be incorporated within the gravity separator tank. In such case, activation of the mixing mechanism will be initiated prior to discharge of the cell. Optionally pipe means 22, as shown, can be used for drawing substantially the water immiscible complex 14a from the bottom of the separator tank. In any event, the bromine phase will be distributed as an emulsion in the aqueous phase and recirculated through the electrolyte chamber during cell discharge.

It should be readily appreciated that while the present invention has been described in connection with a single cell having a separate anolyte and catholyte compartment, a plurality of cells may be employed in battery fashion, with or without separation of the cells into such compartments.

To illustrate the improved coulombic efficiency obtained in accordance with the present invention, reference is made to the following examples.

EXAMPLE 1

In this example, an aqueous electrolye system was prepared having 3.0 M zinc bromide, 0.5 M N-methyl, N-ethyl morphilinium bromide and 0.5 M N-ethyl, N-methyl pyrrolidinium bromide. This electrolyte was employed in a test battery of 8 cells connected in series. These cells had bipolar plates consisting of carbon powder in a polypropylene binder. The electrode area was 600 $cm^2$. A microporous membrane sold under the trade name Daramic by W. R. Grace and Company, Baltimore, Md., was used as the electrode separator. The electrolyte was circulated between the electrodes and the cell was charged at 12 A to 67% of the rated capacity, 52 Ah. The oil that formed during charging of the cell separated in the catholyte separation tank. During discharge of the cell the complex was passed with the elctrolyte into a magnetically coupled centrifugal pump in which the bromine complex was emulsified in the aqueous electrolyte before being fed through the cell. The coulombic efficiency of cycles 120 to 129 and cycles 141 to 145 was 75%.

EXAMPLE 2

In this Example the cell and procedure set forth in Example 1 was followed; however, in this instance the aqueous electrolyte system consisted of 2 M zinc bromide, 0.5 M N-ethyl, N-methyl morphilinium bromide, 0.5 M N-ethyl, N-methyl pyrolidinium bromide and 1 M zinc chloride. The coulombic efficiency for the cell was determined during cycles 130 to 140 and 146 to 150 and for this experiment it was found to be between 81% and 82%.

What is claimed is:

1. An electrochemical cell having a zinc bromine couple, said cell comprising an electrode structure on which zinc is deposited during charging of the cell, a counterelectrode structure at which to generate cathodic bromine during charging of the cell, an aqueous electrolyte comprising a water soluble complexing agent selected from the group consisting of N-methyl, N-ethyl morphilinium bromide, N-methyl, N-ethyl pyrrolidinium bromide, N-methyl, N-ethyl pyrrolidium bromide, N-methyl, N-ethyl piperidinium bromide and mixtures thereof capable of forming a water immiscible complex with bromine, from about 1 to 3 moles per liter zinc bromide and chloride ions in an amount sufficient to reduce the amount of free bromine present in said electrolyte during charging of said cell.

2. The cell of claim 1 wherein said electrolyte contains from about 1.5 to 2.5 moles per liter of zinc bromide and from 0.5 to 1.75 moles per liter chloride ions.

3. The cell of claim 2 wherein said electrolyte contains 0.5 to 1.75 moles of zinc chloride as the source of said chloride ions.

4. The cell of claim 3 wherein said electrolyte contains from about 0.8 to 1.2 moles/liter zinc chloride.

5. A method of enhancing the coulomic efficiency of electrochemical cells employing an aqueous zinc bromide electrolyte containing sufficient bromide ion in said solution to support substantially all of the rated capacity of the cell and a water soluble complexing agent selected from the group consisting of N-methyl, N-ethyl morphilinium bromide, N-methyl, N-ethyl pyrrolidinium bromide, N-methyl, N-ethyl pyrrolidium bromide, N-methyl, N-ethyl piperidinium bromide and mixtures thereof capable of forming a water immiscible complex with bromine said method comprising adding sufficient chloride ions to reduce the amount of free bromine present in said electrolyte during charging of said cell.

6. The method of claim 5 wherein 0.5 to 1.75 moles per liter of zinc chloride is added.

7. The method of claim 6 wherein from 0.8 to 1.2 moles per liter of zinc chloride is added.

* * * * *

UNITED STATES PATENT AND TRADEMARK OFFICE
CERTIFICATE OF CORRECTION

PATENT NO. : 4,491,625

DATED : January 1, 1985

INVENTOR(S) : Edward Kantner

It is certified that error appears in the above-identified patent and that said Letters Patent is hereby corrected as shown below:

On the title page;

At page 1, line 6, after "cathodic bromine", add --The Government of the United States of America has rights in this invention pursuant to Contract No. 40-0483 entered into with Sandia National Laboratories on behalf of the United States Department of Energy.--

Signed and Sealed this

Twenty-third Day of July 1985

[SEAL]

Attest:

DONALD J. QUIGG

*Attesting Officer*   *Acting Commissioner of Patents and Trademarks*